United States Patent
Yang et al.

(10) Patent No.: US 11,289,010 B2
(45) Date of Patent: Mar. 29, 2022

(54) PIXEL CIRCUIT WITH PHOTO-SENSING FUNCTION, A DRIVING METHOD, AND A DISPLAY APPARATUS

(71) Applicant: BOE Technology Group Co., Ltd., Beijing (CN)

(72) Inventors: Shengji Yang, Beijing (CN); Xiaochuan Chen, Beijing (CN); Hui Wang, Beijing (CN); Kuanta Huang, Beijing (CN); Pengcheng Lu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 178 days.

(21) Appl. No.: 16/763,348

(22) PCT Filed: May 22, 2019

(86) PCT No.: PCT/CN2019/087894
§ 371 (c)(1),
(2) Date: May 12, 2020

(87) PCT Pub. No.: WO2020/232654
PCT Pub. Date: Nov. 26, 2020

(65) Prior Publication Data
US 2021/0407379 A1 Dec. 30, 2021

(51) Int. Cl.
*G09G 3/32* (2016.01)
*G06F 3/041* (2006.01)

(52) U.S. Cl.
CPC .............. *G09G 3/32* (2013.01); *G06F 3/0416* (2013.01); *G09G 2320/064* (2013.01); *G09G 2354/00* (2013.01); *G09G 2360/141* (2013.01)

(58) Field of Classification Search
CPC .. G09G 3/32; G09G 3/0416; G06G 2320/064; G06G 2354/00; G06G 2360/141
See application file for complete search history.

(56) References Cited

U.S. PATENT DOCUMENTS 9,741,290 B1 8/2017 Lee et al.
2015/0049046 A1* 2/2015 Tan .......................... G06F 3/044
345/174

(Continued)

FOREIGN PATENT DOCUMENTS

CN 103996376 A 8/2014
CN 104299571 A 1/2015

(Continued)

OTHER PUBLICATIONS

International Search Report & Written Opinion dated Feb. 21, 2020, regarding PCT/CN2019/087894.

*Primary Examiner* — Ryan A Lubit
(74) *Attorney, Agent, or Firm* — Intellectual Valley Law, P.C.

(57) ABSTRACT

The present application discloses a pixel driving circuit with touch-sensing function. The driving circuit includes a first drive-control sub-circuit, a display-drive sub-circuit, a second drive-control sub-circuit, and an emission-control sub-circuit connected in series to generate a drive-current to drive a light-emission device in the subpixel under control of an emission-control signal in a respective one of multiple emission duty periods of a cycle time for displaying one frame of image. The drive circuit also includes a data-input sub-circuit and a charge sub-circuit to set a first voltage to the control terminal of the display-drive sub-circuit. Additionally, the drive circuit includes a photo-sensing sub-circuit configured to reset a photo-sensing device integrated with the light-emission device in the subpixel for touch sensing in a touch-sensing period before entering any one of the multiple emission duty periods of the cycle time.

20 Claims, 8 Drawing Sheets

(56) References Cited

U.S. PATENT DOCUMENTS

| | | | |
|---|---|---|---|
| 2015/0103037 A1* | 4/2015 | Wu | G06F 3/042 345/174 |
| 2015/0193045 A1* | 7/2015 | Zhou | G06F 3/041 345/174 |
| 2015/0325171 A1* | 11/2015 | Zhou | G09G 3/32 345/80 |
| 2016/0062522 A1 | 3/2016 | Yang | |
| 2016/0132171 A1 | 5/2016 | Hu | |
| 2016/0246409 A1* | 8/2016 | Yang | G09G 3/3233 |
| 2016/0253014 A1* | 9/2016 | Yang | G06F 3/042 345/174 |
| 2017/0123542 A1* | 5/2017 | Xie | G06F 3/0416 |
| 2017/0162121 A1* | 6/2017 | Yang | G09G 3/3233 |
| 2018/0211601 A1 | 7/2018 | Chen et al. | |
| 2019/0102015 A1 | 4/2019 | Kim et al. | |

FOREIGN PATENT DOCUMENTS

| | | | |
|---|---|---|---|
| CN | 106504703 A | 3/2017 | |
| CN | 107358918 A | 11/2017 | |
| CN | 107452331 A | 12/2017 | |
| CN | 108538241 A | 9/2018 | |
| CN | 109298804 A | 2/2019 | |
| CN | 109582167 A | 4/2019 | |
| EP | 3675100 A1 | 7/2020 | |

\* cited by examiner

PIXEL CIRCUIT WITH PHOTO-SENSING FUNCTION, A DRIVING METHOD, AND A DISPLAY APPARATUS

CROSS-REFERENCE TO RELATED APPLICATION

This application is a national stage application under 35 U.S.C. § 371 of International Application No. PCT/CN2019/087894, filed May 22, 2019, the contents of which are incorporated by reference in the entirety.

TECHNICAL FIELD

The present invention relates to display technology, more particularly, to a pixel circuit with photo-sensing function, a driving method, and a display apparatus based on micro LED display integrated with photo-sensing function.

BACKGROUND

Light emitting diode has been widely used in display apparatus due to its advantages in high luminance, rich color, low driving voltage, fast response time, and low power consumption. Micro LED allows individually controlling color and light intensity of each subpixel and can be mass manufactured onto any sized display panel with thin-film transfer printing technology. Improvement in integration of an individual display pixel based on micro LED with photo-sensing touch-control function in both aspects of driving circuit design and pixel structure layout is desired.

SUMMARY

In an aspect, the present disclosure provided a driving circuit for a subpixel with in-cell touch-sensing function. The driving circuit includes a first drive-control sub-circuit, a display-drive sub-circuit, a second drive-control sub-circuit, and an emission-control sub-circuit connected in series between a power supply and a light-emission device in the subpixel. The first drive-control sub-circuit and the second drive-control sub-circuit are configured under control of an emission-control signal to pass a drive-current determined by the display-drive sub-circuit to the light-emission device in a respective one of multiple emission duty periods of a cycle time for displaying one frame of image. Additionally, the driving circuit includes a data-input sub-circuit coupled to a first data voltage terminal and a first terminal of the display-drive sub-circuit. Further, the driving circuit includes a charge sub-circuit coupled to a second terminal and a control terminal of the display-drive sub-circuit. Furthermore, the driving circuit includes a first storage sub-circuit coupled between the power supply and the control terminal of the display-drive sub-circuit. The data-input sub-circuit and the charge sub-circuit are configured under control of a first scan signal to set a first voltage to the control terminal of the display-drive sub-circuit. Moreover, the driving circuit includes a photo-sensing sub-circuit configured under control of the first scan signal to reset a photo-sensing device integrated with the light-emission device in the subpixel for detecting a voltage change induced by reflection light from a touch object and under control of a second scan signal to output a voltage signal associated with the voltage change in a touch-sensing period before entering any one of the multiple emission duty periods of the cycle time.

Optionally, the driving circuit further includes a reset sub-circuit having a first transistor with a control terminal receiving a reset signal, a first terminal coupled to an initialization terminal, and a second terminal coupled to a first node coupled to the control terminal of the display-drive sub-circuit.

Optionally, the first transistor is turned in a conduction state under control of the reset signal to reset the first node to an initialization voltage provided from the initialization terminal.

Optionally, the charge sub-circuit includes a second transistor having a control terminal receiving the first scan signal, a first terminal coupled to the second terminal of the display-drive sub-circuit, and a second terminal coupled to the control terminal of the display-drive sub-circuit. The display-drive sub-circuit includes a third transistor having a gate as the control terminal, a source being the first terminal, and a drain being the second terminal. The data-input sub-circuit includes a fifth transistor having a control terminal receiving the first scan signal, a first terminal coupled to the first voltage terminal receiving a first data voltage, and a second terminal coupled to the first terminal of the display-drive sub-circuit. The first storage sub-circuit includes a first capacitor coupled between the control terminal of the display-drive sub-circuit and the power supply.

Optionally, the third transistor is a p-type transistor being turned to a conduction state firstly by the initialization voltage at 0V. The fifth transistor and the second transistor are same type of transistors being turned to the conduction state under control of the first scan signal to allow the first voltage to be charged up to the first data voltage compensated by a threshold voltage of the third transistor. The first capacitor is configured to store the first voltage.

Optionally, the first drive-control sub-circuit includes a fourth transistor having a control terminal receiving an emission-control signal, a first terminal coupled to the power supply, and a second terminal coupled to the first terminal of the display-drive sub-circuit. The second drive-control sub-circuit includes a sixth transistor having a control terminal receiving the emission-control signal, a first terminal coupled to the second terminal of the display-drive sub-circuit, and a second terminal. The emission-control sub-circuit includes a seventh transistor having a first terminal coupled to the second terminal of the sixth transistor, a second terminal coupled to a light-emitting device, and a control terminal coupled to a second node.

Optionally, the fourth transistor and the sixth transistor are same type of transistor.

Optionally, the driving circuit further includes an enable-input sub-circuit coupled to a second data voltage terminal and the second node and a second storage sub-circuit coupled between a common voltage terminal and the second node. The enable-input sub-circuit is configured to provide a second voltage to the second node under control of a second scan signal.

Optionally, the enable-input sub-circuit includes an eighth transistor having a control terminal receiving the second scan signal, a first terminal coupled to the second data voltage terminal to receive a second data voltage, and a second terminal coupled to the second node. The second storage sub-circuit includes a second capacitor coupled between the second node and the common voltage terminal.

Optionally, the eighth transistor is configured to be in a conduction state under control of the second scan signal in the touch-sensing period before entering any one of the multiple emission duty periods of the cycle time to write the second data voltage to the second node stored in the second capacitor.

Optionally, when entering any one of the multiple emission duty periods of the cycle time after the touch-sensing period, the eighth transistor is configured to be in a disconnected state under control of the second scan signal. The seventh transistor is configured to be in a conduction state by the second data voltage at the second node. The fourth transistor and the sixth transistor are configured to be in a conduction state under control of the emission-control signal. The third transistor is configured to be in a saturation state to yield the drive-current depended on a gate-to-source voltage and a threshold voltage. The drive-current is delivered to the light-emitting device in the subpixel to drive light emission with a luminance depending on a length on the respective one of the multiple emission duty periods.

Optionally, the light-emitting device in the subpixel comprises a light-emitting diode and the photo-sensing sub-circuit includes a photo conductive resistor coupled between a common voltage terminal and a sensing node. The photo conductive resistor is disposed next to the light-emitting diode in the subpixel for detecting reflection light from the touch object through an opening region between the light-emitting diode in the subpixel and a neighboring light-emitting diode in a neighboring subpixel.

Optionally, the photo-sensing sub-circuit further includes an initialization transistor having a first terminal coupled to the common voltage terminal, a second terminal coupled to the sensing node, and a control terminal receiving the first scan signal. Additionally, the photo-sensing sub-circuit includes a third capacitor coupled between the common voltage terminal and the sensing node; an amplification transistor having a control terminal coupled to the sensing node, a first terminal coupled to the power supply, and a second terminal; an output transistor having a first terminal coupled to the second terminal of the amplification transistor, a control terminal receiving the second scan signal, and a second terminal; and a charge amplifier having a charge input terminal coupled to the second terminal of the output transistor and a reference input terminal fixed at a reference voltage.

In another aspect, the present disclosure provides a display apparatus with touch sensing function having a subpixel region and an inter-subpixel region. The display apparatus includes an array of a plurality of subpixels. At least one of the plurality of subpixels include the driving circuit described herein. The display apparatus further includes an array of thin film transistors for driving light emitting of a plurality of light emitting elements of the display apparatus. A portion of light emitted from the plurality of light emitting elements is reflected by a surface of the display apparatus in contact with a touch object thereby forming a reflected light. The display apparatus also includes a planarization layer on the array of thin film transistors. Furthermore, the display apparatus includes a light shielding layer on a side of the planarization layer away from the array of thin film transistors. The light shielding layer is configured to block at least a portion of diffusedly reflected light from passing through. The light shielding layer has a light path aperture in the inter-subpixel region allowing at least a portion of the reflected light to pass through thereby forming a signal-enriched light beam. The photo-sensing sub-circuit includes a photo conductive resistor coupled between a common voltage terminal and a sensing node. The photo conductive resistor is in the inter-subpixel region and configured to detect the signal-enriched light beam based on the portion of the reflected light passing through the light path aperture in the inter-subpixel region.

Optionally, the light shielding layer is a relay electrode layer including a plurality of relay electrodes. A respective one of the plurality of relay electrodes electrically connects a drain electrode of a respective one of the plurality of thin film transistors with an anode of a respective one of the plurality of light emitting elements.

In yet another aspect, the present disclosure provides a touch screen apparatus. The touch screen apparatus includes a surface screen and an array of a plurality of subpixels below the surface screen having respective a plurality of light emitting elements. At least one of the plurality of subpixels includes the driving circuit described herein. The touch screen apparatus further includes an array of thin film transistors for driving the plurality of light emitting elements to emit light. Additionally, the touch screen apparatus includes a gap region between the plurality of subpixels allowing a reflected light to pass. The reflected light is a portion of light emitted from the plurality of light emitting elements being reflected by the surface screen in contact with a touch object. Furthermore, the touch screen apparatus includes a planarization layer on the array of thin film transistors. The touch screen apparatus further includes a light shielding layer on a side of the planarization layer away from the array of thin film transistors. The light shielding layer is configured to have a light path aperture projected in the gap region allowing the reflected light to be focused a signal-enriched light beam. Moreover, the touch screen apparatus includes a photo conductive resistor coupled between a common voltage terminal and a sensing node disposed on one side of the light path aperture and configured to detect the signal-enriched light beam.

In still another aspect, the present disclosure provide a method of operating a driving circuit described herein of a subpixel with in-cell touch-sensing and displaying function in a cycle time for displaying one frame of image including at least a touch-sensing period before any one of multiple emission duty periods. The method includes initializing the control terminal of the display-drive sub-circuit to an initialization voltage using a reset sub-circuit coupled to a first node coupled to the control terminal of the display-drive sub-circuit under control of a reset signal in a reset period of the cycle time. Additionally, the method includes inputting a first data voltage via the data-input sub-circuit and charging the first voltage to the first node via the charge sub-circuit under control of the first scan signal in a data-input period of the cycle time. The method further includes resetting a sensing node to a common voltage under control of the first scan signal to make both terminals of the photo-sensing device of the photo-sensing sub-circuit with equal voltage levels in a charge-reset period of the cycle time. Furthermore, the method includes detecting reflection light induced by a touch object by the photo-sensing device to yield the voltage change at the sensing node and outputting a charge flow under control of the second scan signal in the photo-sensing period of the cycle time. Moreover, the method includes enabling the first drive-control sub-circuit at the first terminal of the display-drive sub-circuit and enabling the second drive-control sub-circuit at the second terminal of the display-drive sub-circuit under control of the emission-control signal in the respective one of the multiple emission duty periods to deliver a drive-current from the power supply to the light-emission device.

Optionally, the data-input period is set to be after the reset period and is substantially a same period as the charge-reset period under control of the first scan signal. The first voltage is set to be a first data voltage corresponding to a subpixel image provided at the first data voltage terminal plus a threshold voltage intrinsic to the display-drive sub-circuit. The photo-sensing period is set to be after the charge-reset period and before entering any one of the multiple emission duty periods in the cycle time under control of the second scan signal. The step of outputting a charge flow includes using a charge amplifier to receive the charge flow and output a voltage signal associated with the touch object.

Optionally, the drive-current is generated by the display-drive sub-circuit in a saturation state and yet is substantially independent from the threshold voltage intrinsic to the display-drive sub-circuit. The step of enabling the first drive-control sub-circuit and enabling the second drive-control sub-circuit in the respective one of the multiple emission duty periods include setting the respective one of the multiple emission duty periods based on which a sum of the multiple emission duty periods determines a luminance grayscale of the subpixel.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

For traditional TFT-LCD displays, in order to avoid interference of display grayscale determined by the liquid crystal layer, capacitance-based in-cell touch sensor was preferred. But placing the touch-electrode in-cell causes large parasitic capacitance that affects collection of touch-sensing signal and interferes display signals too. LED displays no longer have liquid crystal layer as display medium, photo-sensing in-cell touch sensor can be employed without worrying about the display being affected by photo-sensing touch control. A LED-based pixel needs a drive current to drive light emission unlike a stable voltage being used to drive the TFT_LCD pixel. Accordingly, the present disclosure provides, inter alia, a driving circuit to drive a subpixel with photo-sensing function, a driving method, and a LED-based display apparatus having photo-sensing touch-sensing function that substantially obviate one or more of the problems due to limitations and disadvantages of the related art.

Figure 1:
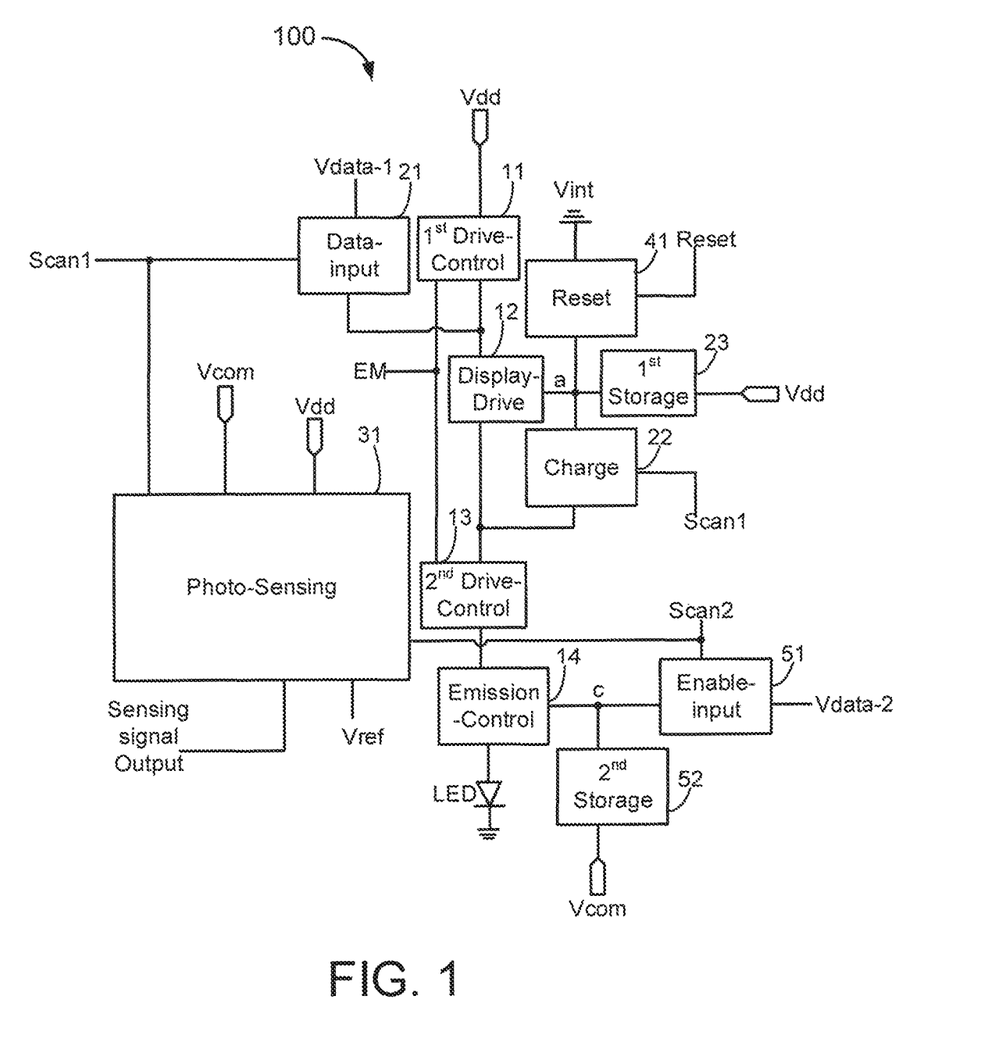
FIG. 1 is a block diagram of a driving circuit for a subpixel with in-cell touch-sensing function according to some embodiments of the present disclosure.

In one aspect, the present disclosure provides a driving circuit for a subpixel with photo-sensing function. The driving circuit is configured to provide a stable driving current to drive a light-emitting device in the subpixel to emit light for display. The driving circuit also is configured to integrate a photo-sensing sub-circuit for providing touch-sensing function during a same cycle of displaying one frame of image per pixel. FIG. 1 shows a block diagram of a driving circuit for a subpixel with in-cell touch-sensing function according to some embodiments of the present disclosure. Referring to FIG. 1, the driving circuit 100 includes a first drive-control sub-circuit 11, a display-drive sub-circuit 12, a second drive-control sub-circuit 13, and an emission-control sub-circuit 14 connected in series between a power supply Vdd and a light-emission device LED in the subpixel. The first drive-control sub-circuit 11 and the second drive-control sub-circuit 13 are configured under control of an emission-control signal EM to pass a drive-current determined by the display-drive sub-circuit 12 to the light-emission device LED in a respective one of multiple emission duty periods of a cycle time for displaying one frame of image. The emission-control sub-circuit 14 is controlled to be turned on or off by its control terminal c. Additionally, the driving circuit 100 includes a data-input sub-circuit 21 coupled to a first data voltage terminal Vdata-1 and a first terminal of the display-drive sub-circuit 12, a charge sub-circuit 22 coupled to a second terminal and a control terminal a of the display-drive sub-circuit 12, a first storage sub-circuit 23 coupled between the power supply Vdd and the control terminal a of the display-drive sub-circuit 12. The data-input sub-circuit 21 and the charge sub-circuit 22 are configured under control of a first scan signal Scan1 to set a first voltage to the control terminal a of the display-drive sub-circuit 12. Furthermore, the driving circuit 100 includes a photo-sensing sub-circuit 31 configured under control of the first scan signal Scan1 to reset a photo-sensing device integrated with the light-emission device LED in the subpixel for detecting a voltage change induced by reflection light from a touch object. The photo-sensing sub-circuit 31 is also configured under control of a second scan signal Scan2 to output a sensing signal associated with the voltage change in a touch-sensing period before entering any one of the multiple emission duty periods of the cycle time. The photo-sensing sub-circuit 31 is coupled to the power supply Vdd. The photo-sensing sub-circuit 31 is also configured to receive a reference voltage Vref.

Figure 2:
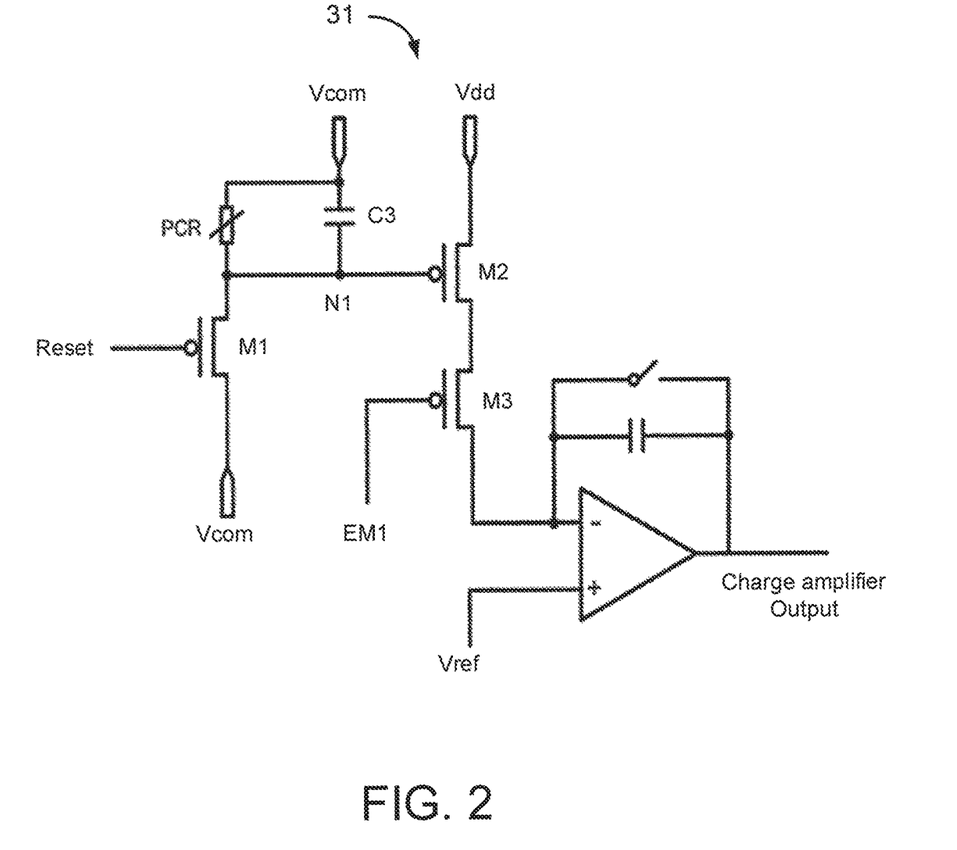
FIG. 2 is an exemplary photo-sensing sub-circuit according to an embodiment of the present disclosure.

In an embodiment, FIG. 2 shows an example of the photo-sensing sub-circuit 31 including a photo conductive resistor (PCR) as the photo-sensing device. Referring to FIG. 2, the photo conductive resistor PCR is coupled in parallel with a (third) capacitor C3 between the power supply Vcom and a sensing node N1. The photo-sensing sub-circuit 31 includes three transistors. An initialization transistor M1 has a control terminal coupled to a reset port to receive a reset-control signal. A first terminal of the initialization transistor M1 is coupled to a common-voltage terminal and a second terminal of the initialization transistor M1 is coupled to the sensing node N1. The reset-control signal is to control the initialization transistor M1 to be conductor so that a common voltage Vcom is applied from the common-voltage terminal to the sensing node N1. Thus, both terminals of the PCR have equal voltage level at Vcom. This makes the sensing node N1 ready to show any voltage change detected by the PCR in response to a photo-sensing touch applied to (top panel of) the pixel. The photo-sensing sub-circuit 31 further includes an amplification transistor M2 having its control terminal coupled to the sensing node N1, a first terminal coupled to the power-supply port Vdd and a second terminal coupled to a first terminal of an output transistor M3. The output transistor M3 has its control terminal configured to receive an output-control signal EMI and its second terminal coupled to a first input port of a charge amplifier. The charge amplifier has its second input port connected to a reference voltage port Vref. The amplification transistor M2 responses to the voltage change (a drop) due to photo-sensing touch substantially linearly so that a current signal can be amplified flowing from the power-supply port Vdd to the second terminal. Further, the output transistor M3 is controlled by the output-control signal EM 1 to further output the current signal to the charge amplifier for further amplification and being outputted as a voltage signal from the charge amplifier output port.

Referring to FIG. 1, the driving circuit 100 further includes a reset sub-circuit 41 for initiating voltage level for the control terminal a of the display-drive sub-circuit 12 to make it ready for being set to the first voltage from the data-input sub-circuit 21 and the charge sub-circuit 22 during operation. Furthermore, the driving circuit 100 includes an enable-input sub-circuit 51 and a second storage sub-circuit 52 configured to set proper voltage level for the control terminal c of the emission-control sub-circuit 14 during operation.

Figure 3:
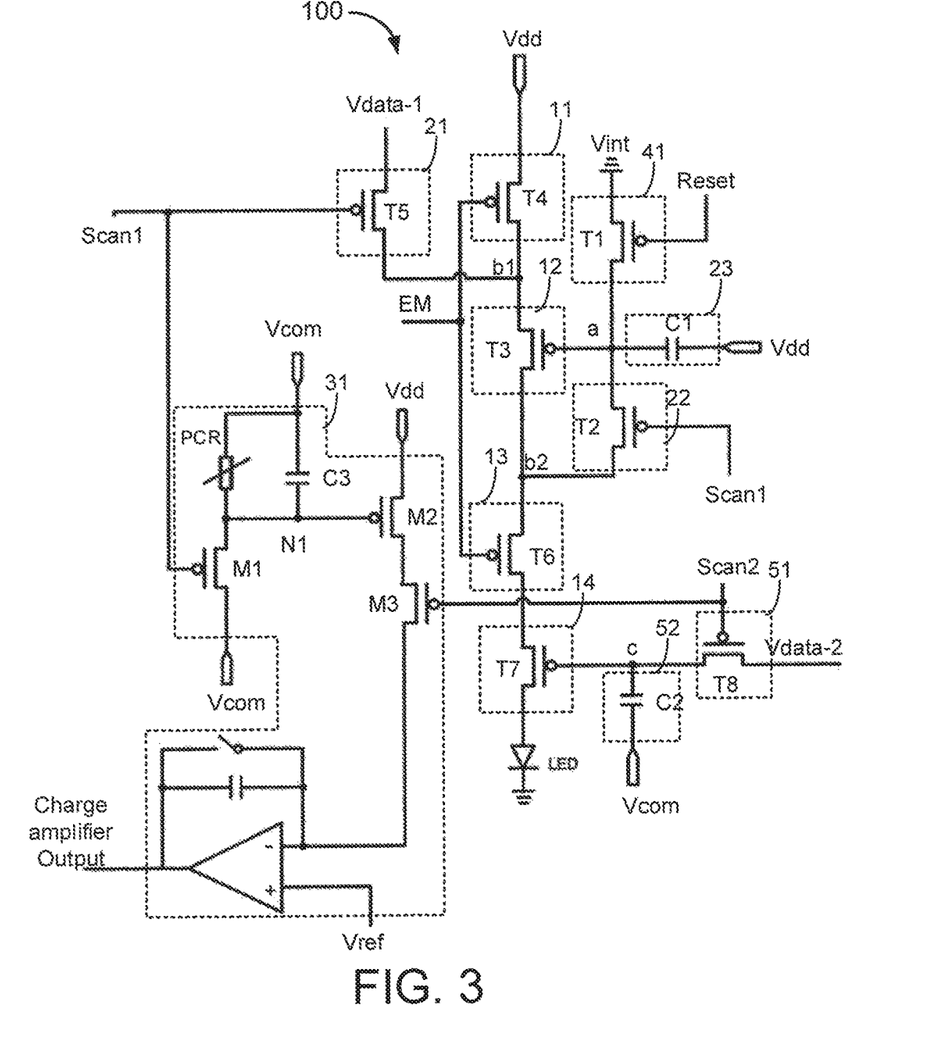
FIG. 3 is a circuit diagram of a pixel driving circuit integrated with a photo-sensing sub-circuit according to an embodiment of the present disclosure.

FIG. 3 is an example of the embodiment of driving circuit having photo-sensing function shown in FIG. 1. Referring to FIG. 3, the reset sub-circuit 41 includes a first transistor T1 with a control terminal receiving a reset signal Reset, a first terminal coupled to an initialization terminal to receive an initialization voltage Vint, and a second terminal coupled to a first node a. The charge sub-circuit 22 includes a second transistor T2 who has a control terminal configured to receive the first scan signal Scan1, a first terminal coupled to a node b2 connecting the display-drive sub-circuit 12 and the second drive-control sub-circuit 13, and a second terminal coupled to the first node a. The display-drive sub-circuit 12 includes a third transistor T3 with control terminal coupled to the first node a, a first terminal coupled to a node b1 connecting the display-drive sub-circuit 12 and the first drive-control sub-circuit 11, and a second terminal coupled to the node b2. The first drive-control sub-circuit 11 includes a fourth transistor T4 having its control terminal configured to receive an emission-control signal EM, a first terminal coupled to the power supply port Vdd, and a second terminal coupled to the node b1 to connect with the display-drive sub-circuit 12. The data-input sub-circuit 21 includes a fifth transistor T5 having a control terminal configured to receive the first scan signal Scan1, a first terminal coupled to a first data-voltage terminal Vdata-1, and a second terminal coupled to the node b1 to connect with the display-drive sub-circuit 12. The second drive-control sub-circuit 13 includes a sixth transistor T6 having a control terminal configured to receive the emission-control signal EM, a first terminal coupled to the node b2 and a second terminal coupled to the emission-control sub-circuit 14. Furthermore, the emission-control sub-circuit 14 includes a seventh transistor T7 having a control terminal coupled to the node c, a first terminal coupled to the second terminal of the sixth transistor T6 and a second terminal coupled to the light-emitting device LED. The enable-input sub-circuit 51 includes an eighth transistor T8 having its control terminal configured to receive the second scan signal Scan2, a first terminal coupled to a second data-voltage terminal Vdata-2 and a second terminal coupled to the node c. The first storage sub-circuit 23 includes a first capacitor C1 having a first terminal coupled to the node a and a second terminal coupled to the power supply port Vdd. The second storage sub-circuit 52 includes a second capacitor C2 having a first terminal coupled to the node c and a second terminal coupled to the common-voltage terminal receiving the common voltage Vcom.

Optionally, all transistors in the driving circuit are made of P-type thin-film transistors. Although the transistor type can be made differently, yet a simplification in one P-type transistor makes the manufacture cost of the display panel lower with higher yield. Referring to FIG. 3 again, the photo-sensing sub-circuit 31 is substantially the same one described in FIG. 2. The photo-sensing device is a photo conductive resistor (PCR). Optionally, the PCR can be made by a Cadmium Sulfide or a Cadmium Selenide material. Cadmium Sulfide is a direct band gap semiconductor (i.e., a band gap of 2.42 eV for CdS) material. When light is irradiated, the conductivity of PCR increases. Optionally, the light-emitting device LED is a light-emitting diode. Optionally, the LED is a micro LED. Optionally, the driving circuit 100 is physically associated with one subpixel in a micro-LED-based display panel. Optionally, each pixel of the micro-LED-based display panel includes one or more sets of subpixels, each set of the subpixels includes a red subpixel, a green subpixel, and a blue subpixel. Optionally, the photo-sensing sub-circuit is at least associated with the driving circuit of the green subpixel. Optionally, the PCR is disposed in a gap region between two neighboring micro LEDs as the photo-sensing sub-circuit is formed in-cell of the associated subpixel in the display panel.

Figure 4A:
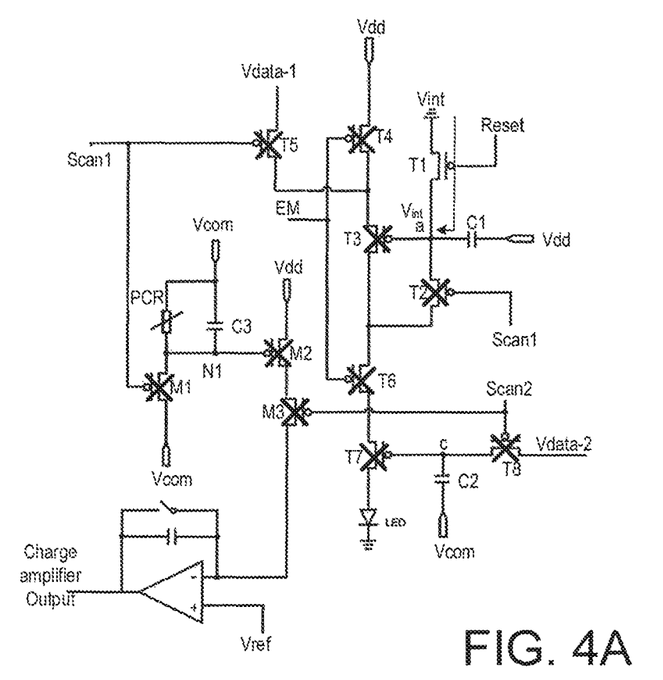
FIG. 4A is a circuit diagram of the pixel driving circuit of FIG. 3 effective in a reset period according to the embodiment of the present disclosure.
Figure 4B:
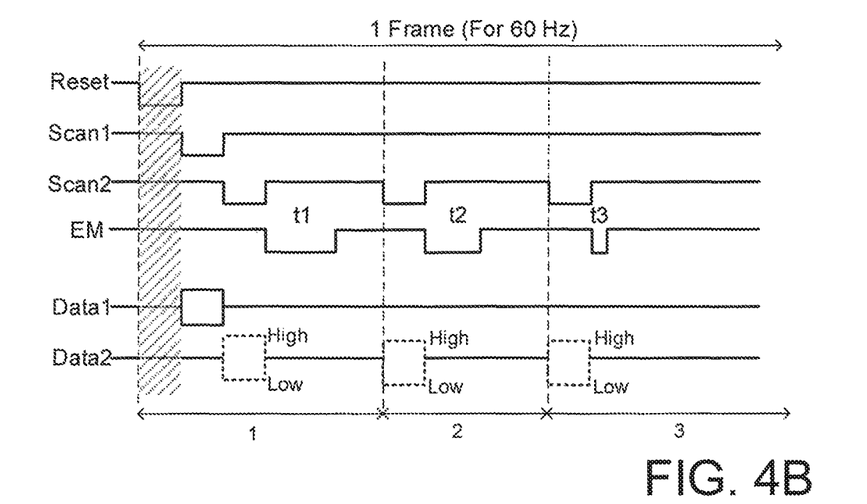
FIG. 4B is a timing diagram of voltage signals for operating the pixel driving circuit of FIG. 3 in the reset period according to the embodiment of the present disclosure.

Based on the driving circuit structure of FIG. 3 provided for the subpixel formed in a display panel, a method of operating the driving circuit is disclosed for driving it for displaying one frame of image in a cycle time while providing in-cell touch-sensing in response to an object touched on top surface of the display panel. FIG. 4A is a circuit diagram of the pixel driving circuit of FIG. 3 effective in a reset period according to the embodiment of the present disclosure. FIG. 4B is a timing diagram of voltage signals for operating the pixel driving circuit of FIG. 3 in the reset period according to the embodiment of the present disclosure. Referring to FIGS. 4A and 4B, in the reset period of a cycle time for displaying one frame of image, the reset signal Reset is provided as a low-voltage signal to turn on the first transistor T1. An initialization voltage Vint is written into the first node a, i.e., the control terminal of the display-drive sub-circuit 12. Optionally, Vint=0V, i.e., the voltage level at the first node a is set to ground. This voltage level can be preserved by the first capacitor C1 which is coupled between the first node a and the power supply port Vdd. All other transistors are turned off with all the control signals, including the first scan signal Scan1, the second scan signal Scan2, the emission-control signal EM, and both the first data-voltage signal Vdata-1 and the second data-voltage signal Vdata-2, being properly set to high-voltage levels in the reset period.

Figure 5A:
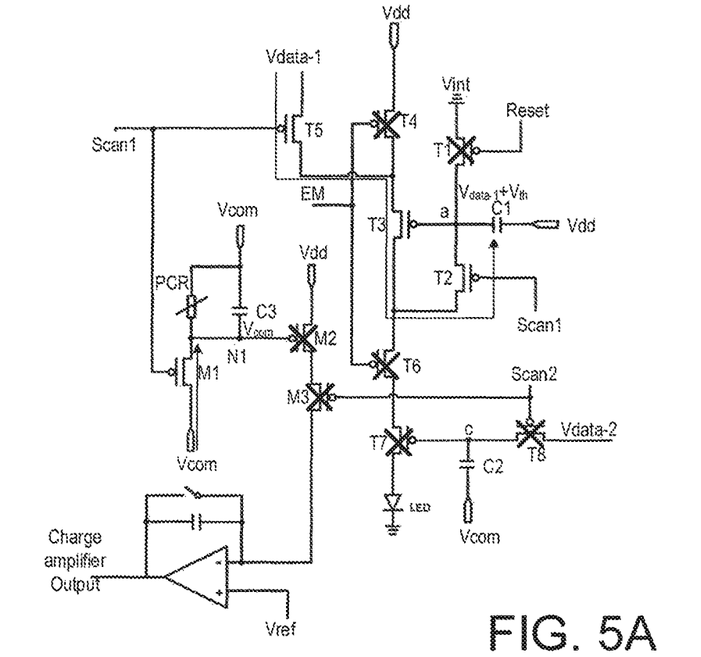
FIG. 5A is a circuit diagram of the pixel driving circuit of FIG. 3 effective in a data-input period according to the embodiment of the present disclosure.
Figure 5B:
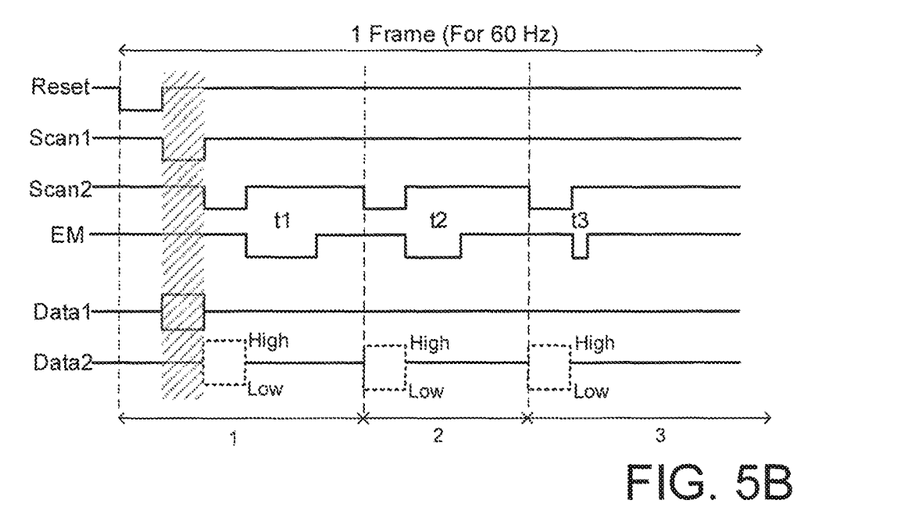
FIG. 5B is a timing diagram of voltage signals for operating the pixel driving circuit of FIG. 3 in the data-input period according to the embodiment of the present disclosure.

FIG. 5A is a circuit diagram of the pixel driving circuit of FIG. 3 effective in a data-input period according to the embodiment of the present disclosure. FIG. 5B is a timing diagram of voltage signals for operating the pixel driving circuit of FIG. 3 in the data-input period according to the embodiment of the present disclosure. Referring to FIGS. 5A and 5B, in the data-input period of the cycle time after the reset period, the first scan signal Scan1 is set to a low-voltage level to allow the fifth transistor T5 and the second transistor T2 to be turned on. Since the third transistor T3, i.e., a driving transistor in the display-drive sub-circuit 12, has been turned on by the initialization voltage Vint=0V in the reset period, the first data-voltage terminal Vdata-1 can be used to charge the first node a through a path of T5→T3→T2 The voltage level at the first node a can be continuously charged higher until it reaches $V_{data}+V_{th}$. Here, $V_{data}$ is the voltage level provided from the first data voltage terminal Vdata-1. $V_{th}$ is a threshold voltage of the driving transistor T3. This voltage $V_{data}+V_{th}$ is determined by a condition to maintain a gate-to-source voltage difference to be the $V_{th}$, and is preserved by the first capacitor C1 once the charge action is finished as the condition is satisfied. In this period, the emission-control signal EM is set to a high-voltage level, keeping the fourth transistor T4 and the sixth transistor T6 off. The second scan signal Scan2 is also set to a high voltage level to keep the seventh transistor T7 and the eighth transistor T8 off, shutting off any current leakage into the LED during this period of charging the first node a.

Additionally, from a point of view of the photo-sensing sub-circuit associated with the driving circuit, the data-input period is also a charge-reset period for the photo conductive resistor (PCR). As seen in FIG. 5B, the first scan signal Scan1 at a low-voltage level also turns the initialization transistor M1 on to allow a common voltage $V_{com}$ provided to a common-voltage terminal Vcom to charge the sensing node N1. This allows the sensing node N1 to be set with an initialization voltage=$V_{com}$. Since the PCR is connected between the common-voltage terminal Vcom (provided with the fixed voltage $V_{com}$) and the sensing node N1, two terminals of the PCR are set to equal voltage levels initially. Two other transistors M2 and M3 are turned off in this period and no touch-sensing signal is outputted yet.

Figure 6A:
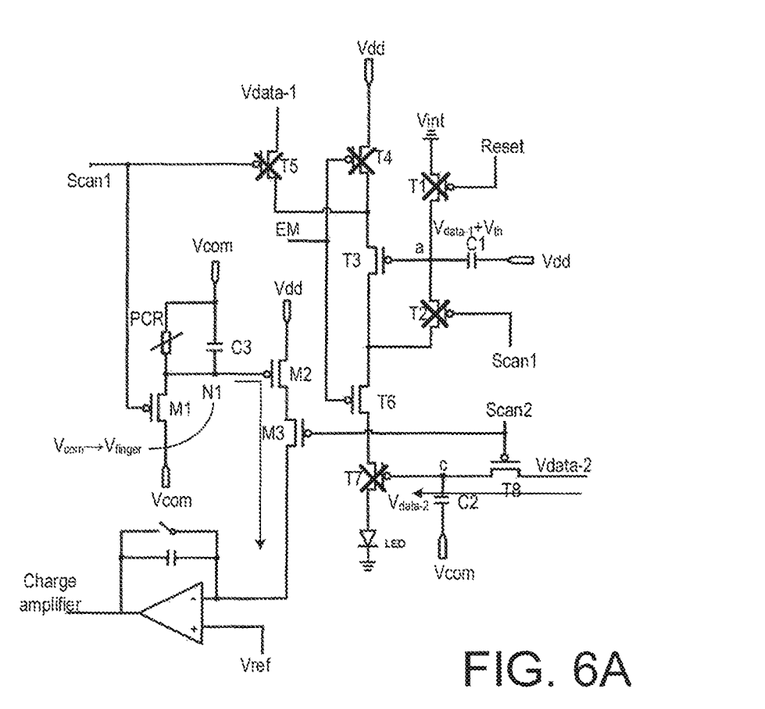
FIG. 6A is a circuit diagram of the pixel driving circuit of FIG. 3 effective in a photo-sensing period according to the embodiment of the present disclosure.
Figure 6B:
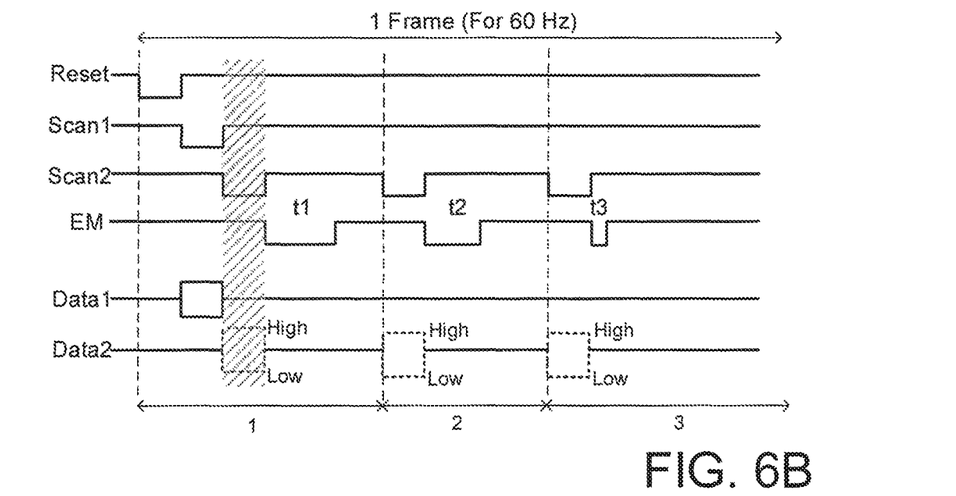
FIG. 6B is a timing diagram of voltage signals for operating the pixel driving circuit of FIG. 3 in the photo-sensing period according to the embodiment of the present disclosure.

FIG. 6A is a circuit diagram of the pixel driving circuit of FIG. 3 effective in a photo-sensing period according to the embodiment of the present disclosure. FIG. 6B is a timing diagram of voltage signals for operating the pixel driving circuit of FIG. 3 in the photo-sensing period according to the embodiment of the present disclosure. Optionally, the photo-sensing period is set to be after the charge-reset period. Referring to FIGS. 6A and 6B, in the photo-sensing period, resistance of the PCR in the photo-sensing sub-circuit 31 drops to a lower value as it detects a reflected light from a touch object at a position above the subpixel. A lower resistance value results in a lower voltage across the PCR, leading to a drop of voltage level at the sensing node N1 from $V_{com}$ to $V_{finger}$ in this period. Since the response of PCR to the light has a time delay, the reflected light sensed by the PCR could be from light emission of the LEDs nearby during an emission period in a previous cycle time. Depended on proper selection of the PCR, the lowered voltage level of $V_{finger}$ at the sensing node N1 allows a current flowing from the common-voltage terminal Vcom to the sensing node N1. The lower voltage at the sensing node N1 also allows the amplification transistor M2 to be turned on to output a drain current, which amplifies the current flowing from the sensing note N1, to the output transistor M3. As shown in FIGS. 6A and 6B, the second scan signal Scan2 is set to a low voltage level during this period, allowing the output transistor M3 to be turned on so that the drain current from the amplification transistor M2 to pass through the output transistor M3 and is fed as a sensing current signal into one input port of the charge amplifier (with another input port being coupled to a reference voltage terminal Vref). The charge amplifier further amplifies the sensing current signal and outputs a sensing voltage signal for deducing information about the touch object.

During the photo-sensing period, all transistors of T1 through T7 in the driving circuit is shut off except that the eighth transistor T8 is turned on as the second scan signal Scan2 is set to the low voltage level. A proper voltage can be set to the second node c from the second data voltage terminal Vdata-2 and be preserved there. In particular, during this period, the voltage level at the second node c, which is also the control terminal of the seventh transistor T7, is set to a high voltage level and preserved by the second capacitor C2 to shut off the emission-control sub-circuit 14 or is set to a low voltage level to turn the seventh transistor T7 on.

Figure 7A:
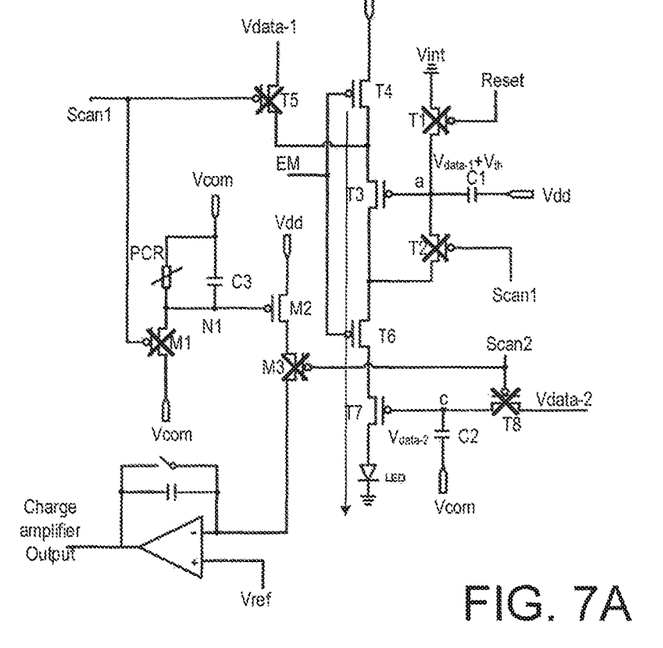
FIG. 7A is a circuit diagram of the pixel driving circuit of FIG. 3 effective in an emission period according to the embodiment of the present disclosure.
Figure 7B:
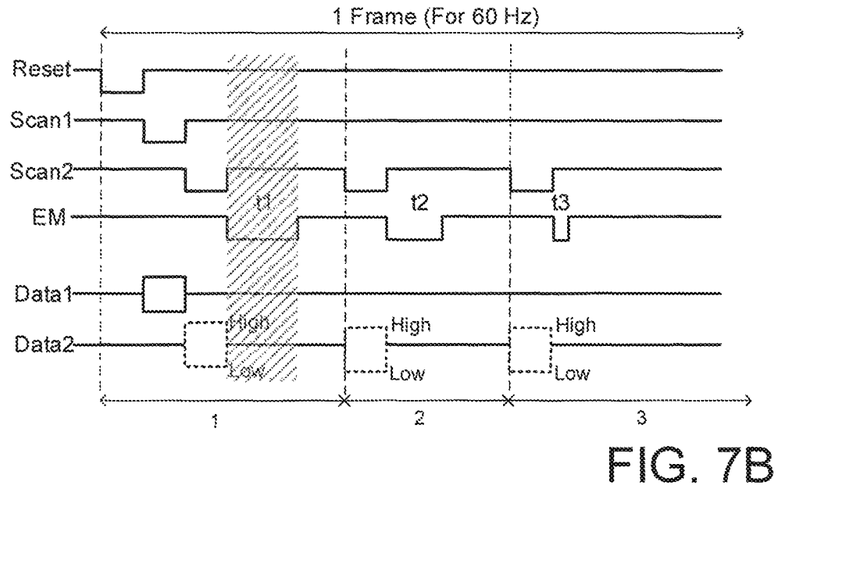
FIG. 7B is a timing diagram of voltage signals for operating the pixel driving circuit of FIG. 3 in the emission period according to the embodiment of the present disclosure.

FIG. 7A is a circuit diagram of the pixel driving circuit of FIG. 3 effective in one of multiple emission duty periods according to the embodiment of the present disclosure. FIG. 7B is a timing diagram of voltage signals for operating the pixel driving circuit of FIG. 3 in one of multiple emission duty periods according to the embodiment of the present disclosure. Optionally, a photo-sensing period is set before entering any one of the multiple emission duty periods in the cycle time under control of the second scan signal. Referring to FIGS. 7A and 7B, in the current emission duty period, the emission-control signal EM is provided with a low-voltage pulse with a designated pulse width. The driving transistor T3 is working in a saturation state and the seventh transistor T7 is turned on by the enable-input sub-circuit 51 in this period to have a drive-current flow in a path from the power supply port Vdd (provided with a positive voltage $V_{dd}$) through four transistors T4→T3→T6→T7 to the LED to cause light emission. The source of the driving transistor T3 is in a voltage of $V_{dd}$ as the fourth transistor T4 is in on-state. The gate of the driving transistor T3 is locked at $V_{data}+V_{th}$. The drive-current I through the driving transistor T3 can be expressed as:

$$I = K(V_{GS} - V_{th})^2$$
$$= K[(V_{data} + V_{th}) - V_{dd} - V_{th}]^2$$

-continued $$= K(V_{data} - V_{dd})^2$$

As seen from the formula, the drive-current I is explicitly no longer affected by the threshold voltage $V_{th}$ and only depended on $V_{data}$ and $V_{dd}$. Therefore, the drift problem of the threshold voltage $V_{th}$ due to manufacturing process and long operation time of the driving transistor has been resolved.

Optionally, the second scan signal Scan2 is set to high voltage level to shut off the output transistor M3 of the photo-sensing sub-circuit so that no photo-sensing is performed within the emission duty period to enhance signal-to-noise ratio for image display. Optionally, the cycle time of displaying one frame of image includes multiple emission duty periods. One photo-sensing period can be set, with the second scan signal Scan2 being at a low voltage to turn on the output transistor M3, before entering each of the multiple emission duty periods. Each emission duty period contains a given time-span in which the LED is driven by the drive-current I to emit light. The time-span is determined by the pulse width of the emission-control signal EM that opens the first drive-control transistor T4 and the second drive-control transistor T6. In an example, referring to FIG. 7B, the cycle time includes three emission duty periods, as labeled sequentially as t1, t2, and t3, of different time-spans which yield different luminance grayscale levels ranging from 0 to $2^3=8$ levels. Practically, more emission duty periods are provided to each cycle time, more luminance grayscale levels of the subpixel can be generated.

Figure 8:
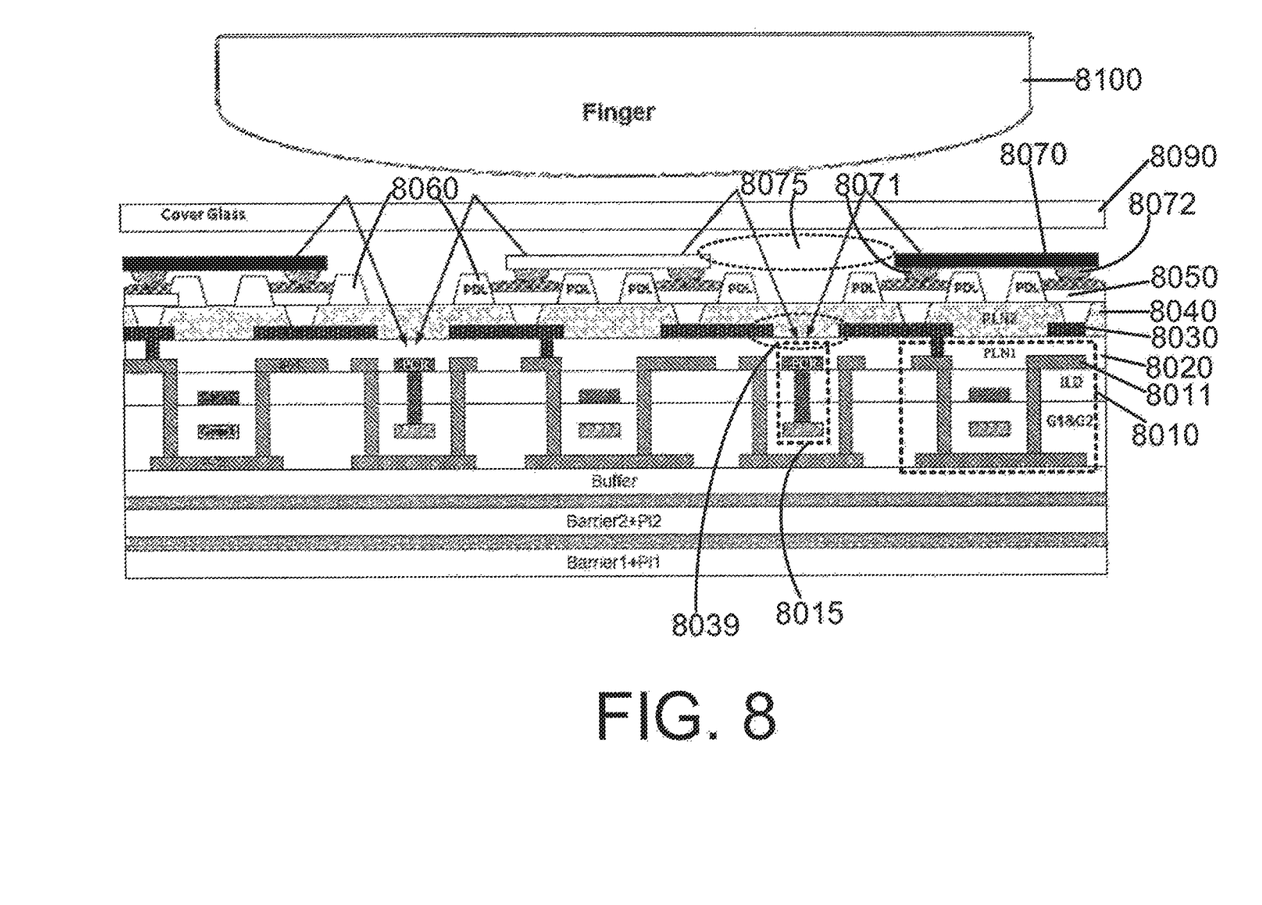
FIG. 8 is a schematic diagram of a LED-based display pixel integrated with an in-cell touch-control photo-sensor according to an embodiment of the present disclosure.

In an alternative aspect, the present disclosure provides a display apparatus with touch sensing function having a subpixel region and an inter-subpixel region. The display apparatus includes an array of a plurality of subpixels. At least one of the plurality of subpixels includes the driving circuit described herein (as shown in FIG. 1 or FIG. 3). Optionally, a display pixel of the display apparatus includes one or more sets of subpixels. FIG. 8 shows a schematic diagram of a display pixel integrated with an in-cell touch-control photo-sensor according to an embodiment of the present disclosure. Referring to FIG. 8, the display apparatus includes an array of thin film transistors 8010 formed on a substrate for driving light emitting of a plurality of light emitting elements 8070 coupled with in-cell photo-sensing element 8015. Optionally, the light emitting element 8070 is a light-emitting diode. In a specific embodiment, the light-emitting diode is a micro LED. Optionally, the in-cell photo-sensing element 8015 is a photo conductive resistor. In yet another aspect, the display apparatus with touch sensing function disclosed here is also a touch sensing screen or a touch-control apparatus or a touch-control structure.

Optionally, the array of thin-film transistors is formed on a glass substrate or backplane substrate. Referring to FIG. 8, the array of thin-film transistors 8010 is formed on top of a buffer layer over multiple barrier layers and combined with multiple planarization layers over the backplane substrate. A first planarization layer 8020 is overlaid on a source-drain electrode layer 8011 of the array of thin-film transistors 8010. A light shielding layer 8030 is then formed overlying the first planarization layer 8020. The light shielding layer 8030 is a relay electrode layer comprising a plurality of relay electrodes. A respective one of the plurality of relay electrodes electrically connects a drain electrode of a respective one of the plurality of thin film transistors 8010 with an anode 8071 of a respective one of the plurality of micro light-emitting diodes 8070. Optionally, the light shielding layer 8030 is a metal layer which can effectively block light passage or have designated openings 8039 allowing light to pass. Optionally, the designated opening 8039 is formed in an inter-subpixel region in an array of a plurality of subpixels of the display apparatus. The array of a plurality of subpixels is defined by a pixel-definition layer (PDL) 8060 with each subpixel characterized by a micro light-emitting diode 8070 across an anode 8071 and a cathode 8072 and spatially separated by a gap region 8075 from any neighboring subpixels. The gap region 8075 is substantially projected from the designated opening 8039 which is formed directly above a photo conductive resistor 8015. The anode 8071 and the cathode 8072 are respectively coupled to corresponding relay electrodes in the light shielding layer 8030 through electrically conductive vias 8050 embedded in a second planarization layer 8040. Optionally, the anode 6071 of a micro light-emitting diode 8070 is connected to the drain electrode of a respective one thin-film transistor 8010 in the subpixel.

Optionally, the micro LED 8070 in a respective one subpixel of the array of the plurality of subpixels is configured to be driven by a drive-current flowing from the drain electrode of the thin-film transistor to the anode of the micro LED to emit either a red light, or a green light, or a blue light. A portion of light emitted from the plurality of micro LEDs is reflected by a surface of a cover glass 8090 of the display apparatus in contact with a touch object 8100 (such as a finger) thereby forming a reflected light. The light shielding layer 8030 is configured to block at least a scattering or diffusing portion of the reflected light from passing through, and has the designated opening 8039 forming a light path aperture in the inter-subpixel region allowing at least a directional portion of the reflected light to pass through and focus as a signal-enriched light beam substantially utilizing a small-hole imaging principle. The photo conductive resistor 8015 is coupled between a common voltage terminal and a sensing node located in the inter-subpixel region and configured to detect the directional portion of the reflected light focused through the light path aperture in the inter-subpixel region. The small hole structure provided by the designated opening 8039 allows the photo conductive resistor 8015 to detect the directional portion of the reflected light with enhanced sensitivity, which maximizes the sensitivity of finger touch detection. Optionally, each pixel of the display apparatus includes one or more sets of red, green, and blue subpixels. Optionally, one pixel can include one photo-sensing element. Optionally, multiple pixels contain one photo-sensing element. Optionally, the photo-sensing elements in the display apparatus is uniformly distributed. Optionally, the photo-sensing elements in the display apparatus is periodically distributed in an array. Optionally, the photo-sensing element includes a photo conductive resistor associated with a green subpixel.

In the dark, the photo conductive resistor can have a resistance as high as several megohms (MΩ), while in the light, the photo conductive resistor can have a resistance as low as a few hundred ohms. If a light irradiated on a photo conductive resistor exceeds a certain frequency, photons absorbed by the semiconductor give bound electrons enough energy to jump into the conduction band. The resulting free electrons (and their hole partners) conduct electricity, thereby lowering resistance. The resistance range and sensitivity of a photoresistor can substantially differ among dissimilar devices. As the photo conductive resistor detects the reflected light from the touch object 8100, lower resistance results in higher conductivity associated with the sensing node (e.g., sensing node N1 in FIG. 2 and FIG. 3), making the voltage level at the sensing node to drop. Referring to FIG. 3, the reduced voltage level at sensing node N1, which is also a control terminal of an amplification transistor, causes a change of an output current flowing through the output transistor M3. This output current eventually gets amplified by a charge amplifier, which is captured as a sensing current about a particular location of the touch object 8100 associated with this pixel. For example, the touch object 8100 is a finger surface. Optionally, the location of the finger surface is a fingerprint ridge location which produces stronger reflected light. Optionally, the location of the finger surface is a fingerprint valley location which produces weaker reflected light. The sensing currents induced by different strengths of the reflected light from fingerprint ridge location or fingerprint valley location are different. Based on difference of the sensing currents among different pixels at different locations, a fingerprint map or image can be determined.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A driving circuit for a subpixel with in-cell touch-sensing function comprising:
    a first drive-control sub-circuit, a display-drive sub-circuit, a second drive-control sub-circuit, and an emission-control sub-circuit connected in series between a power supply and a light-emission device in the subpixel, the first drive-control sub-circuit and the second drive-control sub-circuit being configured under control of an emission-control signal to pass a drive-current determined by the display-drive sub-circuit to the light-emission device in a respective one of multiple emission duty periods of a cycle time for displaying one frame of image;
    a data-input sub-circuit coupled to a first data voltage terminal and a first terminal of the display-drive sub-circuit, a charge sub-circuit coupled to a second terminal and a control terminal of the display-drive sub-circuit, a first storage sub-circuit coupled between the power supply and the control terminal of the display-drive sub-circuit, the data-input sub-circuit and the charge sub-circuit being configured under control of a first scan signal to set a first voltage to the control terminal of the display-drive sub-circuit; and
    a photo-sensing sub-circuit configured under control of the first scan signal to reset a photo-sensing device integrated with the light-emission device in the sub-pixel for detecting a voltage change induced by reflection light from a touch object and under control of a second scan signal to output a voltage signal associated with the voltage change in a touch-sensing period before entering any one of the multiple emission duty periods of the cycle time.

2. The driving circuit of claim 1 further comprising:
    a reset sub-circuit having a first transistor with a control terminal receiving a reset signal, a first terminal coupled to an initialization terminal, and a second terminal coupled to a first node coupled to the control terminal of the display-drive sub-circuit.

3. The driving circuit of claim 2, wherein the first transistor is turned in a conduction state under control of the reset signal to reset the first node to an initialization voltage provided from the initialization terminal.

4. The driving circuit of claim 3, wherein the charge sub-circuit comprises a second transistor having a control terminal receiving the first scan signal, a first terminal coupled to the second terminal of the display-drive sub-circuit, and a second terminal coupled to the control terminal of the display-drive sub-circuit;
    the display-drive sub-circuit comprises a third transistor having a gate as the control terminal, a source being the first terminal, and a drain being the second terminal;
    the data-input sub-circuit comprises a fifth transistor having a control terminal receiving the first scan signal, a first terminal coupled to the first voltage terminal receiving a first data voltage, and a second terminal coupled to the first terminal of the display-drive sub-circuit; and
    the first storage sub-circuit comprises a first capacitor coupled between the control terminal of the display-drive sub-circuit and the power supply.

5. The driving circuit of claim 4, wherein the third transistor is a p-type transistor being turned to a conduction state firstly by the initialization voltage at 0V; the fifth transistor and the second transistor are same type of transistors being turned to the conduction state under control of the first scan signal to allow the first voltage to be charged up to the first data voltage compensated by a threshold voltage of the third transistor; the first capacitor is configured to store the first voltage.

6. The driving circuit of claim 4, wherein the first drive-control sub-circuit comprises a fourth transistor having a control terminal receiving an emission-control signal, a first terminal coupled to the power supply, and a second terminal coupled to the first terminal of the display-drive sub-circuit; the second drive-control sub-circuit comprises a sixth transistor having a control terminal receiving the emission-control signal, a first terminal coupled to the second terminal of the display-drive sub-circuit, and a second terminal; and the emission-control sub-circuit comprises a seventh transistor having a first terminal coupled to the second terminal of the sixth transistor, a second terminal coupled to a light-emitting device, and a control terminal coupled to a second node.

7. The driving circuit of claim 6, wherein the fourth transistor and the sixth transistor are same type of transistor.

8. The driving circuit of claim 6, further comprising an enable-input sub-circuit coupled to a second data voltage terminal and the second node and a second storage sub-circuit coupled between a common voltage terminal and the second node, the enable-input sub-circuit being configured to provide a second voltage to the second node under control of a second scan signal.

9. The driving circuit of claim 8, wherein the enable-input sub-circuit comprises an eighth transistor having a control terminal receiving the second scan signal, a first terminal coupled to the second data voltage terminal to receive a second data voltage, and a second terminal coupled to the second node; and the second storage sub-circuit comprises a second capacitor coupled between the second node and the common voltage terminal.

10. The driving circuit of claim 9, wherein the eighth transistor is configured to be in a conduction state under control of the second scan signal in the touch-sensing period before entering any one of the multiple emission duty periods of the cycle time to write the second data voltage to the second node stored in the second capacitor.

11. The driving circuit of claim 9, wherein, when entering any one of the multiple emission duty periods of the cycle time after the touch-sensing period, the eighth transistor is configured to be in a disconnected state under control of the second scan signal;

the seventh transistor is configured to be in a conduction state by the second data voltage at the second node;

the fourth transistor and the sixth transistor are configured to be in a conduction state under control of the emission-control signal; and the third transistor is configured to be in a saturation state to yield the drive-current depended on a gate-to-source voltage and a threshold voltage, the drive-current being delivered to the light-emitting device in the subpixel to drive light emission with a luminance depending on a length on the respective one of the multiple emission duty periods.

12. The driving circuit of claim 3, wherein the light-emitting device in the subpixel comprises a light-emitting diode and the photo-sensing sub-circuit comprises a photo conductive resistor coupled between a common voltage terminal and a sensing node, the photo conductive resistor being disposed next to the light-emitting diode in the subpixel for detecting reflection light from the touch object through an opening region between the light-emitting diode in the subpixel and a neighboring light-emitting diode in a neighboring subpixel.

13. The driving circuit of claim 12, wherein the photo-sensing sub-circuit further comprises:

an initialization transistor having a first terminal coupled to the common voltage terminal, a second terminal coupled to the sensing node, and a control terminal receiving the first scan signal;

a third capacitor coupled between the common voltage terminal and the sensing node;

an amplification transistor having a control terminal coupled to the sensing node, a first terminal coupled to the power supply, and a second terminal;

an output transistor having a first terminal coupled to the second terminal of the amplification transistor, a control terminal receiving the second scan signal, and a second terminal; and a charge amplifier having a charge input terminal coupled to the second terminal of the output transistor and a reference input terminal fixed at a reference voltage.

14. The driving circuit of claim 13, wherein the initialization transistor is configured, under control of the first scan signal, to initialize the sensing node to a common voltage provided at the common voltage terminal to make voltages at two terminals of the photo conductive resistor equal initially;

the third capacitor is configured to store a charge due to the voltage change at the sensing node from the common voltage to a lower voltage induced by the reflection light detected by the photo conductive resistor;

the amplification transistor is configured to operate in a linear state to output a charge flow to the second terminal thereof;

the output transistor is configured to be turned to a conduction state under control of the second scan signal in the touch-sensing period before entering the multiple emission duty periods of the cycle time to pass the charge flow to the charge amplifier; and the charge amplifier is configured to have the charge input terminal to receive the charge flow and convert the charge flow to an amplified voltage signal outputted for touch-sensing.

15. A display apparatus with touch sensing function having a subpixel region and an inter-subpixel region, comprising an array of a plurality of subpixels, at least one of the plurality of subpixels comprising the driving circuit of claim 1;

wherein the display apparatus further comprising an array of thin film transistors for driving light emitting of a plurality of light emitting elements of the display apparatus, a portion of light emitted from the plurality of light emitting elements being reflected by a surface of the display apparatus in contact with a touch object thereby forming a reflected light;

a planarization layer on the array of thin film transistors; and a light shielding layer on a side of the planarization layer away from the array of thin film transistors, the light shielding layer being configured to block at least a portion of diffusedly reflected light from passing through, and having a light path aperture in the inter-subpixel region allowing at least a portion of the reflected light to pass through thereby forming a signal-enriched light beam; and wherein the photo-sensing sub-circuit comprises a photo conductive resistor coupled between a common voltage terminal and a sensing node;

the photo conductive resistor is in the inter-subpixel region and configured to detect the signal-enriched light beam based on the portion of the reflected light passing through the light path aperture in the inter-subpixel region.

16. The display apparatus of claim 15, wherein the light shielding layer is a relay electrode layer comprising a plurality of relay electrodes, a respective one of the plurality of relay electrodes electrically connecting a drain electrode of a respective one of the plurality of thin film transistors with an anode of a respective one of the plurality of light emitting elements.

17. A touch screen apparatus comprising:
- a surface screen;
- an array of a plurality of subpixels below the surface screen having respective a plurality of light emitting elements, at least one of the plurality of subpixels comprising the driving circuit of claim 1;
- an array of thin film transistors for driving the plurality of light emitting elements to emit light;
- a gap region between the plurality of subpixels allowing a reflected light to pass, the reflected light being a portion of light emitted from the plurality of light emitting elements being reflected by the surface screen in contact with a touch object;
- a planarization layer on the array of thin film transistors;
- a light shielding layer on a side of the planarization layer away from the array of thin film transistors, the light shielding layer being configured to have a light path aperture projected in the gap region allowing the reflected light to be focused a signal-enriched light beam; and
- a photo conductive resistor coupled between a common voltage terminal and a sensing node disposed on one side of the light path aperture and configured to detect the signal-enriched light beam.

18. A method of operating a driving circuit of a subpixel with in-cell touch-sensing and displaying function in a cycle time for displaying one frame of image including at least a touch-sensing period before any one of multiple emission duty periods, the driving circuit including:
- a first drive-control sub-circuit, a display-drive sub-circuit, a second drive-control sub-circuit, and an emission-control sub-circuit connected in series between a power supply and a light-emission device in the subpixel, the first drive-control sub-circuit and the second drive-control sub-circuit being configured under control of an emission-control signal to pass a drive-current determined by the display-drive sub-circuit to the light-emission device in a respective one of multiple emission duty periods of the cycle time for displaying one frame of image;
- a data-input sub-circuit coupled to a first data voltage terminal and a first terminal of the display-drive sub-circuit, a charge sub-circuit coupled to a second terminal and a control terminal of the display-drive sub-circuit, a first storage sub-circuit coupled between the power supply and the control terminal of the display-drive sub-circuit, the data-input sub-circuit and the charge sub-circuit being configured under control of a first scan signal to set a first voltage to the control terminal of the display-drive sub-circuit; and
- a photo-sensing sub-circuit configured under control of the first scan signal to reset a photo-sensing device integrated with the light-emission device in the subpixel for detecting a voltage change induced by reflection light from a touch object and under control of a second scan signal to output a voltage signal associated with the voltage change in a photo-sensing period before entering any one of the multiple emission duty periods of the cycle time;

the method comprising:
- initializing the control terminal of the display-drive sub-circuit to an initialization voltage using a reset sub-circuit coupled to a first node coupled to the control terminal of the display-drive sub-circuit under control of a reset signal in a reset period of the cycle time;
- inputting a first data voltage via the data-input sub-circuit and charging the first voltage to the first node via the charge sub-circuit under control of the first scan signal in a data-input period of the cycle time;
- resetting a sensing node to a common voltage under control of the first scan signal to make both terminals of the photo-sensing device of the photo-sensing sub-circuit with equal voltage levels in a charge-reset period of the cycle time;
- detecting reflection light induced by a touch object by the photo-sensing device to yield the voltage change at the sensing node and outputting a charge flow under control of the second scan signal in the photo-sensing period of the cycle time; and
- enabling the first drive-control sub-circuit at the first terminal of the display-drive sub-circuit and enabling the second drive-control sub-circuit at the second terminal of the display-drive sub-circuit under control of the emission-control signal in the respective one of the multiple emission duty periods to deliver a drive-current from the power supply to the light-emission device.

19. The method of claim 18, wherein the data-input period is set to be after the reset period and is substantially a same period as the charge-reset period under control of the first scan signal, wherein the first voltage is set to be a first data voltage corresponding to a subpixel image provided at the first data voltage terminal plus a threshold voltage intrinsic to the display-drive sub-circuit;
wherein the photo-sensing period is set to be after the charge-reset period and before entering any one of the multiple emission duty periods in the cycle time under control of the second scan signal, wherein outputting a charge flow comprises using a charge amplifier to receive the charge flow and output a voltage signal associated with the touch object.

20. The method of claim 19, wherein the drive-current is generated by the display-drive sub-circuit in a saturation state and yet is substantially independent from the threshold voltage intrinsic to the display-drive sub-circuit, wherein enabling the first drive-control sub-circuit and enabling the second drive-control sub-circuit in the respective one of the multiple emission duty periods comprise setting the respective one of the multiple emission duty periods based on which a sum of the multiple emission duty periods determines a luminance grayscale of the subpixel.

* * * * *